United States Patent
Liebischer et al.

(10) Patent No.: US 9,802,837 B2
(45) Date of Patent: Oct. 31, 2017

(54) APPARATUS AND PROCESS FOR TREATING LIQUIDS CONTAINING CHLOROSILANES

(71) Applicant: Wacker Chemie AG, Munich (DE)

(72) Inventors: Sebastian Liebischer, Muehldorf (DE); Daniel Braeunling, Munich (DE); Daniel Gaess, Burghausen (DE); Jeffery Thompson, Grandview, TN (US)

(73) Assignee: WACKER CHEMIE AG, Munich (DE)

(*) Notice: Subject to any disclaimer, the term of this patent is extended or adjusted under 35 U.S.C. 154(b) by 80 days.

(21) Appl. No.: 14/783,620

(22) PCT Filed: Mar. 19, 2014

(86) PCT No.: PCT/EP2014/055471
§ 371 (c)(1),
(2) Date: Oct. 9, 2015

(87) PCT Pub. No.: WO2014/166710
PCT Pub. Date: Oct. 16, 2014

(65) Prior Publication Data
US 2016/0068408 A1 Mar. 10, 2016

(30) Foreign Application Priority Data
Apr. 9, 2013 (DE) ............... 10 2013 206 228

(51) Int. Cl.
*B01D 1/00* (2006.01)
*C02F 1/04* (2006.01)
(Continued)

(52) U.S. Cl.
CPC ........... *C02F 1/048* (2013.01); *B01D 1/00* (2013.01); *B01D 1/0041* (2013.01); (Continued)

(58) Field of Classification Search
CPC ...... B01D 1/00; B01D 1/0041; C01B 33/107; C01B 33/10778; C02F 1/048; C02F 1/38;
(Continued)

(56) References Cited

U.S. PATENT DOCUMENTS

| 4,408,030 A | 10/1983 | Marko |
| 4,519,999 A | 5/1985 | Coleman et al. |
| 4,690,810 A * | 9/1987 | Breneman ............ A62D 3/35 |
| | | 423/240 R |
| 5,246,594 A | 9/1993 | Stegemann et al. |

(Continued)

FOREIGN PATENT DOCUMENTS

| JP | 59-078942 A | 5/1984 |
| JP | 63-214321 A | 9/1988 |

(Continued)

*Primary Examiner* — Duane Smith
*Assistant Examiner* — Cabrena Holecek
(74) *Attorney, Agent, or Firm* — Brooks Kushman P.C.

(57) ABSTRACT

Chlorosilane-containing process streams are treated by vaporizing the process stream, contacting the vaporized process stream with an alkaline medium in a scrubber, the scrubbing liquid being maintained at a pH of 9-13 by introduction of alkaline medium, and feeding the scrubbing medium to a waste treatment plant containing at least one mixing tank in which the pH is adjusted to the range of 7-9 by addition of mineral acid, separating solids by means of a centrifuge, and isolating separated solids.

12 Claims, 2 Drawing Sheets

(51) Int. Cl.
*C02F 1/38* (2006.01)
*C01B 33/107* (2006.01)
*C02F 1/66* (2006.01)
*C02F 9/00* (2006.01)
*C02F 101/12* (2006.01)

(52) U.S. Cl.
CPC ...... *C01B 33/107* (2013.01); *C01B 33/10778* (2013.01); *C02F 1/38* (2013.01); *C02F 1/66* (2013.01); *C02F 9/00* (2013.01); *C02F 1/385* (2013.01); *C02F 2101/12* (2013.01); *C02F 2209/06* (2013.01)

(58) Field of Classification Search
CPC ........ C02F 1/385; C02F 1/66; C02F 2101/12; C02F 2209/06; C02F 9/00; G01N 2333/47; G01N 2800/2821; G01N 2800/52; G01N 33/6896
See application file for complete search history.

(56) References Cited

U.S. PATENT DOCUMENTS

| | | |
|---|---|---|
| 5,246,682 A | 9/1993 | Ruff et al. |
| 5,660,615 A | 8/1997 | Neumann et al. |
| 5,757,660 A | 5/1998 | Musow |
| 6,030,591 A | 2/2000 | Tom et al. |
| 7,204,963 B2 | 4/2007 | Rauleder et al. |
| 7,611,684 B2 | 11/2009 | Johnsgard et al. |
| 2004/0213721 A1 | 10/2004 | Arno et al. |
| 2011/0150739 A1 | 6/2011 | Seliger et al. |

FOREIGN PATENT DOCUMENTS

| | | |
|---|---|---|
| JP | 2-157020 A | 6/1990 |
| JP | 5-213605 A | 8/1993 |
| JP | 2002102646 A | 4/2002 |
| WO | 2010016117 A1 | 2/2010 |

* cited by examiner

APPARATUS AND PROCESS FOR TREATING LIQUIDS CONTAINING CHLOROSILANES

CROSS REFERENCE TO RELATED APPLICATIONS

This application is the U.S. National Phase of PCT Appln. No. PCT/EP2014/055471 filed Mar. 19, 2014, which claims priority to German Application No. 10 2013 206 228.1 filed Apr. 9, 2013, the disclosures of which are incorporated in their entirety by reference herein.

BACKGROUND OF THE INVENTION

1. Field of the Invention

The invention relates to an apparatus and a process for treating chlorosilane-containing liquids.

2. Description of the Related Art

Some processes and apparatuses of this type, in particular scrubber systems, are already known in the prior art.

U.S. Pat. No. 6,030,591 A discloses a process for removing and recovering halogenated hydrocarbons from process output streams. The term halogenated hydrocarbons encompasses perfluorinated hydrocarbons, partially fluorinated hydrocarbons and chlorofluorocarbons and also sulfur hexafluoride and nitrogen trifluoride. The removal of other gas components from fluorine compound gas streams is effected by oxidation combined with contact with a dry material (adsorption medium) or scrubbing medium.

In one embodiment, the use of an alkaline scrubbing medium (pH>9) for more efficient scrubbing of acidic gases is described. In addition, this alkali scrubber operates at above atmospheric pressure.

U.S. Pat. No. 4,519,999 A discloses a wastewater treatment in silicon production. It provides a combustion process with scrubbing of a liquid/a gas in a hydrolysis-neutralization zone by contact with water and an alkali metal present therein. The scrubber serves mainly to recover the hydrochloric acid formed by combustion of waste streams at various temperatures.

U.S. Pat. No. 5,246,682 A discloses a process for the wastewater-free work-up of residues from a chlorosilane distillation using hydrochloric acid. The process is carried out using hydrochloric acid with liberation of hydrogen chloride. Part of the reaction mixture coagulates and is removed by drying and heat treatment (~140° C.).

U.S. Pat. No. 5,660,615 A discloses an offgas scrubbing process which comprises two steps. Firstly, a scrubbing stage is carried out in the temperature range 30-150° C. In a second step, the offgas is brought into contact with circulated aqueous salt solution having a pH of <5.

US 20040213721 A1 discloses an apparatus and a process for treating offgas streams at the place of use. The scrubbing process is based on an aqueous scrubbing medium containing a reducing agent (sodium thiosulfate, ammonium hydroxide, potassium iodide) and consists of at least two stages. In the scrubbing system, it is possible to use removable push-in beds composed of a plurality of packing materials.

U.S. Pat. No. 7,611,684 B2 and U.S. Pat. No. 5,757,660 A and also U.S. Pat. No. 5,246,594 A disclose scrubber control systems and processes. They are based on measurement methods for regulating and monitoring the pH and the concentration of the scrubbing medium. This is effected by means of a pH sensor, conductivity measurements or redox potential measurements.

U.S. Pat. No. 7,204,963 B2 also discloses a process consisting of two steps for separating chlorosilanes from gas streams. The offgas stream is, in a first stage treated with steam in the gas phase and then, in a second stage, treated with a liquid, aqueous phase.

US 20110150739 A1 discloses a process for removing boron-containing impurities from halosilanes and an apparatus for carrying out the process.

U.S. Pat. No. 4,408,030 A discloses a waste chlorosilane treatment using an aqueous medium. The scrubbing medium contains concentrated hydrochloric acid.

JP 2157020 A discloses a process for treating dichlorosilane-containing gas with alkaline earth metal hydroxides or oxides having a pH of 6-8.5.

The prior art does not disclose any processes in which chlorosilanes can be removed in a single step and under ambient conditions without having to make recourse to packing materials. In addition, waste streams containing particles are often obtained in the prior art.

The objective of the invention arose from these problems.

SUMMARY OF THE INVENTION

The object of the invention is achieved by a process for treating a liquid containing at least one chlorosilane, which comprises vaporization of the liquid, treatment of the vaporized liquid by contact with an alkaline medium in a scrubbing chamber so as to give a scrubbing liquid having a pH of 9-13, and subsequent treatment of scrubbing liquid taken off from the scrubbing chamber in a wastewater treatment apparatus, wherein an acid is added in order to set a pH of 6-9 and solids are separated off from the scrubbing liquid by means of a centrifuge.

DETAILED DESCRIPTION OF THE PREFERRED EMBODIMENTS

Figure 1:
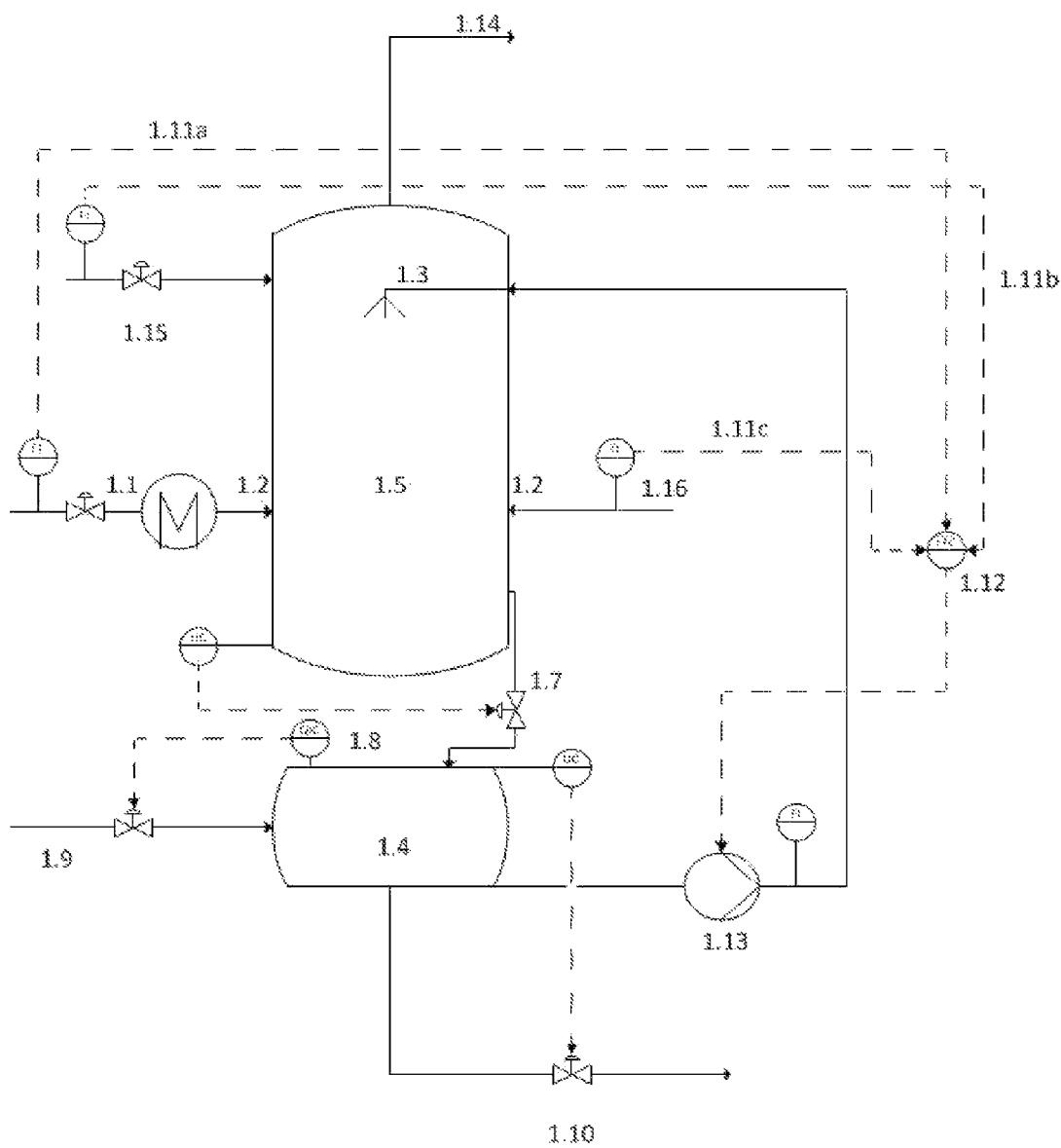
FIG. 1 schematically shows a scrubbing system.

The liquid can be a mixture of chlorosilanes, methylchlorosilanes and boron-containing halide compounds.

The treatment of the liquid can be effected together with other liquids or vapors, including HCl and $H_2$ vapor.

The vaporized chlorosilane-containing stream preferably comprises $H_2$.

The vaporized chlorosilane-containing stream preferably comprises HCl.

Gaseous offgases are preferably added after vaporization.

The alkaline medium is preferably an aqueous solution of alkali or an alkaline base. Particular preference is given to using an aqueous solution of sodium hydroxide (NaOH).

The water used can be surface water, deionized water or desalinated water. The water preferably comes from a surrounding stock of water.

A scrubbing liquid is preferably maintained at a pH in the range of pH=9-13, more preferably maintained at a pH in the range pH=10-12.

The stream is preferably regulated in a scrubbing chamber.

The pH values in the scrubbing liquid are preferably regulated.

Alkaline medium is preferably introduced into the scrubbing liquid reservoir in order to keep the pH in the scrubber in the desired range.

The process provides for partial removal of a scrubbing liquid to the wastewater treatment apparatus.

Preference is given to providing a first mixing tank, where the pH can be measured in order to determine how much neutralizing acid is required for the first mixing tank and can be transmitted to a pump which supplies a neutralizing acid.

The neutralizing acid is introduced into the first mixing tank and then passed on. The neutralizing acid is preferably a mineral acid, most preferably hydrochloric acid (HCl).

A flocculent is preferably added to the mixing tank.

The final pH in the first mixing tank after supply of acid is preferably 6-9, more preferably 6-8, and most preferably 7-8. Preference is given to measuring and transmitting the pH in order to determine how much neutralizing acid is required for the second mixing tank.

The neutralizing acid is introduced into the second mixing tank and passed on. The neutralizing acid is preferably a mineral acid, particularly preferably hydrochloric acid (HCl).

A flocculent is preferably added to the mixing tank.

A pH measurement is preferably carried out in the second mixing tank. The final pH in the second mixing tank after supply of acid is preferably 6-9, more preferably 6-8, and most preferably 7-8.

The separation apparatus is preferably a centrifuge.

The content of particulate material which can be removed preferably makes up a proportion by volume of 0-1.5% of the feed from the second mixing tank.

This preferably comprises removal of excess water from the particulate material, filling of the filter press, removal of the solids by filtration, squeezing of the solids and removal of the filter cake.

A pH measurement apparatus which transmits the data to a distributor is preferably provided downstream of the centrifuge.

The system preferably opens or closes valves in the distributor in order to recirculate water which is no longer within specification to a second mixing tank.

The apparatus for carrying out the process comprises at least one vaporizer unit for vaporizing a liquid chlorosilane-containing stream, at least one scrubbing chamber in order to bring the vaporized liquid into contact with an alkaline medium, at least one waste water treatment apparatus;

wherein the scrubbing chamber comprises at least one inlet in order to feed vaporized liquid from the vaporizer unit to the scrubbing chamber, at least one nozzle by means of which alkaline medium can be sprayed continuously into the scrubbing chamber, and an outlet in order to feed scrubbed gas to the wastewater treatment apparatus, and the wastewater treatment apparatus comprises a feed device for scrubbing liquid from the scrubbing chamber and a centrifuge for separating solids from the scrubbing liquid.

The apparatus preferably comprises a vessel having a stock of water.

The scrubbing chamber preferably comprises at least one inlet for introduction of additional water (makeup water).

The apparatus preferably comprises a return loop for reuse of scrubbing liquid.

The apparatus preferably comprises a vessel for storing liquid removed from the scrubber.

The apparatus preferably comprises a first mixing tank for addition of a neutralizing acid.

The apparatus preferably comprises a second mixing tank for addition of a neutralizing acid.

The apparatus preferably comprises a separation apparatus for taking up the contents of a second mixing tank.

The wastewater treatment apparatus preferably comprises a centrifuge which is suitable for removing a plurality of particulate materials from the feed to the second mixing tank.

An additional apparatus for taking up particulate material removed from the centrifuge is preferably provided. This apparatus is preferably a filter press. The filter press most preferably comprises a plurality of membrane filters.

It has been found that the invention makes it possible to prevent transport of particulate material from the scrubber and avoid emissions. Regulation of the pH in the scrubber to about pH 11 is critical for this purpose.

The wastewater treatment is intended to precipitate silicates and remove them in a centrifuging and filter pressing process.

The present invention preferably relates to the treatment of low-boiling liquid compounds containing mainly chlorosilanes.

These low-boiling chlorosilane compounds comprise mainly one or more compounds having boiling points which are less than or equal to the boiling point of monomethyldichlorosilane ($CH_3HCl_2Si$), $T_b=41.5°$ C.

In general, the boiling point of compounds in this stream should be in the range from the boiling point of dichlorosilane ($H_2Cl_2Si$), $T_b=8.3°$ C., and that of monomethyldichlorosilane ($CH_3HCl_2Si$), $T_b=41.5°$ C.

The compositions of these chlorosilane-containing streams can generally contain dichlorosilane ($H_2Cl_2Si$), trichlorosilane ($HCl_3Si$), monomethyldichlorosilane ($CH_4Cl_2Si$) and boron-containing compounds such as boron trichloride ($BCl_3$), but are not restricted thereto.

In addition, it is possible to introduce a gaseous stream comprising $H_2$, HCl and a smaller volume of chlorosilanes into the scrubber. Such streams can, for example, arise in the field of polysilicon production, in particular in relation to the residues of distillation products of low- to middle-boiling compounds, or in the field of silicone production.

One skilled in the art will possibly also find one or more other applications in which there are such streams and the process of the invention and the apparatus can be useful. The working examples of the invention serve merely for the purposes of illustration and should not be interpreted as a restriction to a specific application.

The present invention has the advantage that a largely particle-free stream is obtained in the scrubber. Any type of water can be used in the scrubbing chamber. The formation of insoluble alkaline earth metal silicates is avoided as far as possible.

The process makes do without any combustion of process streams.

A treatment with an alkaline medium is carried out. The treatment is carried out in the gas phase and at ambient temperatures.

The scrubbing process itself comprises only one step, which represents a simplification compared to the prior art.

No packing material is necessary. The use of an additional reducing agent is not necessary.

The process and the apparatus are illustrated below with the aid of FIGS. 1 and 2.

LIST OF THE REFERENCE NUMERALS USED

1.1 vaporizing heat exchanger
1.2 scrubber inlet
1.3 nozzle 1.4 scrubbing liquid reservoir
1.5 scrubbing chamber
1.6 valves
1.7 pump system
1.8 pH measurement
1.9 alkali feed line
1.10 feed line to wastewater treatment
1.11a-c measurements
1.12 control device
1.13 pump
1.14 outlet
1.15 water feed line
1.16 feed device for gaseous stream
2.1 pH measurement 1
2.2 mixing tank 1
2.3 feed line for neutralizing acid
2.4 addition of flocculent
2.5 pH measurement 2
2.6 mixing tank 2
2.7 feed line for neutralizing acid
2.8 centrifuge
2.9 filter press unit
2.10 solids waste station
2.11 pH measurement
2.12 outlet A chlorosilane stream containing mainly liquids is vaporized by means of a vaporizing heat exchanger 1.1.

In addition, it is possible to introduce a gaseous stream comprising $H_2$, HCl and a relatively small volume of chlorosilanes into the scrubber by means of a feed device 1.16.

The vaporized stream is introduced together with any other vaporized/gaseous streams to be scrubbed via the scrubber inlet 1.2.

In the scrubber, an alkaline solution, which will hereinafter be referred to as scrubbing liquid and can consist of any alkaline base and water, is sprayed from scrubber nozzles 1.3.

The base is preferably sodium hydroxide (NaOH).

Water for the scrubbing liquid can be surface water, deionized or desalinated water or will come directly from a surrounding body of water and is introduced via the water feed line 1.15.

The scrubbing liquid is present in a scrubbing liquid reservoir.

This scrubbing liquid reservoir 1.4 can either be an independent apparatus or can be present in the scrubbing chamber.

The scrubbing liquid is brought into contact with the incoming gas stream in the scrubbing chamber 1.5.

This scrubbing liquid preferably has a measurable pH range of 10-12, in particular when using water having a high content of divalent mineral materials.

This pH range results in at least two key advantages.

The product formed by this scrubbing process, mainly silicates, is soluble in the scrubbing liquid at elevated pH and water having a relatively high mineral content can be used in the system. At a lower pH, (silica) particles occur in the gas stream, as a result of which the scrubbing efficiency is reduced.

Furthermore, handling downstream of the scrubber is made more difficult by the sparingly soluble silica. The scrubber system is operated under ambient temperature conditions.

The system comprises a means of regulating the level in the scrubbing chamber 1.5.

In one embodiment, the system comprises at least one or more control devices which report back the level of the scrubber in order to prevent overflows and can actuate one or more valves 1.6 in order to retard or shut off any incoming streams.

In another embodiment, the system can comprise a method of removing overflow by means of a permanently open valve.

The system preferably comprises a removal and a recirculation of used scrubbing liquid in the system, by means of a suction valve and a pump system 1.7.

Since scrubbed chlorosilane streams contain HCl, the pH of the scrubbing liquid and thus the effectiveness of the scrubbing liquid decrease over time.

When the pH is below a particular threshold value, product precipitates. This can be a problem which makes it necessary either to discharge (silica) particles into the atmosphere or to install additional solids handling facilities downstream of the scrubber.

A pH is therefore measured by means of a pH measurement 1.8 in a scrubbing liquid reservoir 1.4 before the reintroduction into the scrubber.

This pH is compared with the reference pH and an appropriate amount of makeup alkaline is introduced into the scrubbing liquid reservoir 1.4 via the alkali feed line 1.9.

Figure 2:
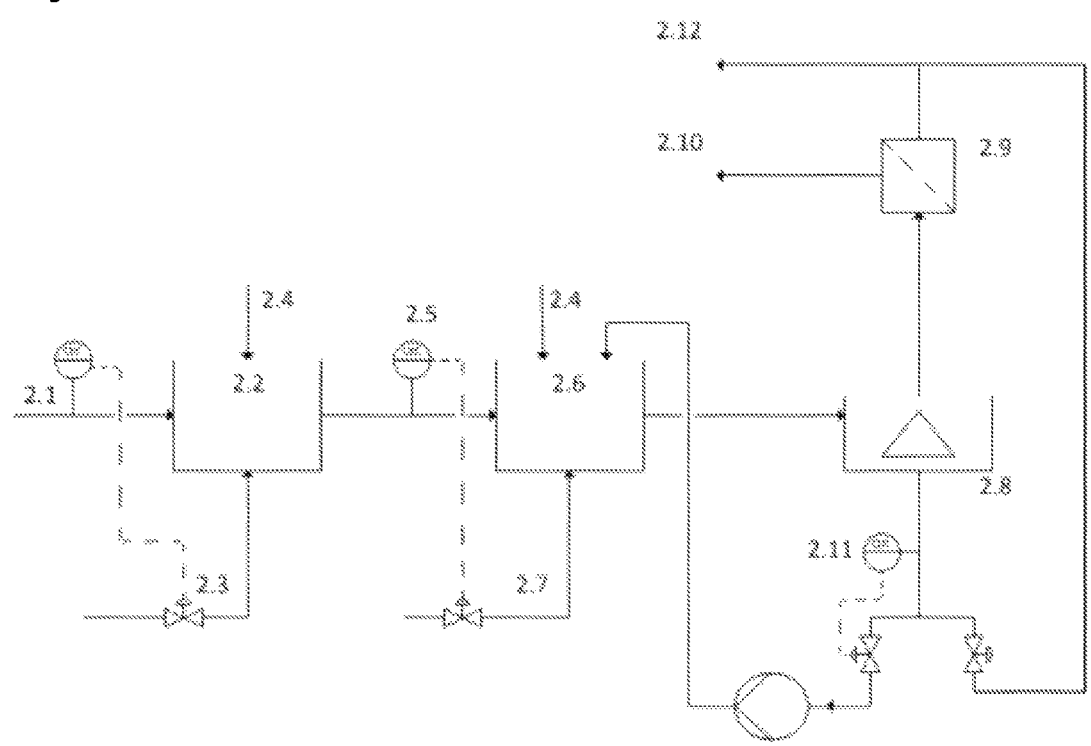
FIG. 2 schematically shows a wastewater treatment system.

A fixed amount of scrubbing liquid is taken from the scrubbing reservoir and fed via the feed line to wastewater treatment 1.10 to the wastewater treatment apparatus, cf. FIG. 2.

In an embodiment of the present invention, the amount of scrubbing liquid to be added can be calculated by measuring the incoming streams and compositions (1.11a,b,c).

However, this measurement is not necessary for all embodiments of the present invention.

This calculation can be transmitted to a control device 1.12 which acts on either a single-stage pump or an adjustable pump 1.13 in order to lay down the flow rate of scrubbing liquid entering the scrubber.

Scrub gas is removed via outlet 1.14.

The scrubbing liquid which is removed either periodically or continuously has an increased hydrolyzate product content and is strongly basic.

The pH of this incoming stream is measured by means of pH measurement 2.1 upstream of a first mixing tank 2.2.

On the basis of the pH of the incoming stream, a signal is sent to a feed facility 2.3 for neutralizing acid in order to neutralize the solution to a pH range of preferably 6-9, more preferably 7-9 and most preferably 7-8.

In one embodiment, flocculent 2.4 can be added to precipitate particles.

After removal from the first mixing tank, the pH is measured again by means of pH measurement 2.5 upstream of a second mixing tank 2.6.

On the basis of the pH of the incoming stream, a signal is sent to a feed facility for neutralizing acid 2.7 in order to neutralize the solution to a pH range of preferably 6-9, more preferably 7-9 and most preferably 7-8.

The now neutralized scrubbing liquid is fed to a centrifuge 2.8.

Since the solution now has a lower pH, the solids present are very much less water-soluble and a metastable slurry is formed, as a result of which the solids can be removed more easily by centrifugation.

As a result of this neutralization with subsequent centrifugation, the present invention can have a considerably greater capacity than other systems, as demonstrated in the following examples.

The solids from the centrifuge 2.8 are removed and fed to a filter press unit 2.9.

Solids are removed and optionally treated in the solid waste station 2.10.

The liquid is once again tested to determine its pH, by means of pH measurement 2.11.

If a pH which is too high is still found, this liquid can be recirculated to the second mixing tank 2.6.

Liquid from the filter press 2.9 is added to the liquid stream from the centrifuge 2.8 and removed from the system via outlet 2.12.

EXAMPLES

A stream which contains mainly chlorosilanes and is typical of the type fed to the scrubbing system can display a considerable variation in respect of the chlorosilane loading. A robust wastewater treatment by means of which a very wide range of particle loadings can be removed would therefore be desirable.

As examples for the suitability of the wastewater treatment apparatus described herein, three different wastewater scenarios are presented and shown in Table 1.

The scenarios correspond to a low loading (minimum), a medium loading (medium) and a high loading (maximum), which are fed to the centrifuge 2.8 shown in FIG. 2.

The capability of this system to cope with a high capacity based on the ratio between the contents in the concentrate and starting material is presented.

To describe the efficiency of this apparatus, a concentration factor is defined as the content of the component, on a volume basis, to be attained in the output stream divided by the content of the component to be found in the starting material.

In the minimum case, the solids content in the output stream has a concentration factor of 38.5.

In the medium case, the concentration factor is 31.3.

In the maximum case, the concentration factor is 39.1.

The sediment in the concentrate had corresponding concentration factors of 40, 33.9 and 34.3, respectively, for minimum, medium and maximum. These concentration factors were not obtained when using other conventional sedimentation techniques such as clarification apparatuses.

This system therefore has a wide range of possible starting materials for which a similar output stream behavior can be produced.

In all cases, the turbidity measurements carried out for all cases are clearly within the present laid-down EPA limits, 250 NTU.

TABLE 1

Solids removal by centrifugation

|  | Minimum | Medium | Maximum |
|---|---|---|---|
| Solids content in the starting material | 0.2 g/l | 0.78 g/l | 1.78 g/l |
| Sediment in the starting material | 0.05% by volume | 0.56% by volume | 1.75% by volume |
| Solids content in the overflow | 0.0 g/l | 0.09 g/l | 1.27 g/l |
| Turbidity in the overflow | 2 NTU | 21 NTU | 109 NTU |
| Solids content in the concentrate | 7.7 g/l | 24.4 g/l | 49.7 g/l |
| Sediment in the concentrate | 2% by volume | 19% by volume | 60% by volume |

After centrifugation, the solids were fed to the filtration press, component 2.9 in FIG. 2.

Once again, results are shown for three concentrations which are quite close to the abovementioned minimum, medium and maximum.

Once again, the solids concentration can be assessed.

In the minimum scenario, a concentration factor of 110.5/m is obtained.

In the medium scenario, a concentration factor of 57.2/m is obtained.

Finally, in the maximum scenario, a concentration factor of 48.8/m is obtained.

The increased concentration factor for the minimum scenario can be assessed both as additional time for filtrations and as reduced blockage of the filter.

TABLE 2

Solids removal in the filter press

| Test | Minimum | Medium | Maximum |
|---|---|---|---|
| Slurry concentration | 6.1 g/l | 18.4 g/l | 43.8 g/l |
| Cake height | 12 mm | 18 mm | 25 mm |
| Solids in the cake after filtration | 232 kg/m$^3$ | 166 kg/m$^3$ | 205 kg/m$^3$ |
| Slurry loading | 0.348 m$^3$/m$^2$ | 0.153 m$^3$/m$^2$ | 0.092 m$^3$/m$^2$ |
| Solids loading | 2.1 kg/m$^2$ | 2.9 kg/m$^2$ | 4.2 kg/m$^2$ |
| Filtration time | 2.5 h | 0.9 h | 1.2 h |
| Time including squeezing | 2.7 h | 1.1 h | 1.4 h |
| Moisture | 67.4% | 71.3% | 70% |
| Dry matter | 32.6% | 28.7% | 30% |

The invention claimed is:

1. A process for treating a liquid containing at least one chlorosilane, comprising vaporizing the liquid to form a vaporized liquid, treating the vaporized liquid by contacting the vaporized liquid with an alkaline medium in a scrubbing chamber to provide a scrubbing liquid having a pH of 9-13, and subsequently treating scrubbing liquid from the scrubbing chamber in a wastewater treatment apparatus, wherein the treatment in the wastewater treatment apparatus comprises the addition of an acid into the scrubbing liquid in the wastewater treatment apparatus to establish a pH of 6-9 to precipitate silicates, and separating solids formed in the scrubbing liquid in the wastewater treatment apparatus by means of a centrifuge.

2. The process of claim 1, wherein the alkaline medium is an aqueous solution of sodium hydroxide.

3. The process of claim 2, wherein the scrubbing liquid is maintained at a pH of 9-13 by addition of alkaline medium during the treating of the vaporized liquid in the scrubbing chamber.

4. The process of claim 1, wherein the scrubbing liquid is maintained at a pH of 9-13 by addition of alkaline medium during the treating of the vaporized liquid in the scrubbing chamber.

5. The process of claim 1, wherein a mineral acid is added in the wastewater treatment apparatus.

6. The process of claim 5, wherein the mineral acid comprises HCl.

7. The process of claim 1, wherein solids separated by means of the centrifuge are collected in a solids-collecting apparatus.

8. The process of claim 7, wherein the solids-collecting apparatus comprises a filter press.

9. An apparatus for conducting the process of claim 1, comprising:
 a) at least one vaporizer unit for vaporizing a liquid chlorosilane-containing stream;

b) at least one scrubbing chamber containing an alkaline medium;

c) at least one wastewater treatment apparatus;

wherein the scrubbing chamber comprises at least one inlet which feeds vaporized liquid from the vaporizer unit to the scrubbing chamber, at least one nozzle which sprays alkaline medium into the scrubbing chamber, and an outlet which feeds scrubbed gas to the wastewater treatment apparatus, and wherein the wastewater treatment apparatus comprises a feed device for feeding scrubbing liquid from the scrubbing chamber and a centrifuge for separating solids from the scrubbing liquid.

10. The apparatus of claim 9, wherein the wastewater treatment apparatus comprises a mixing tank for determining the pH of scrubbing liquid and a pump for feeding acid to the mixing tank.

11. The apparatus of claim 9, wherein solids-collecting apparatus is provided in order to collect solids separated by means of the centrifuge.

12. The apparatus of claim 11, wherein the solids-collecting apparatus comprises a filter press.

\* \* \* \* \*